United States Patent
Mitsuno et al.

(10) Patent No.: US 7,674,730 B2
(45) Date of Patent: Mar. 9, 2010

(54) NONWOVEN FABRIC

(75) Inventors: Satoshi Mitsuno, Kagawa-ken (JP); Hirotomo Mukai, Kagawa-ken (JP); Hiroki Goda, Kagawa-ken (JP)

(73) Assignee: Uni-Charm Corporation, Ehime-ken (JP)

( * ) Notice: Subject to any disclaimer, the term of this patent is extended or adjusted under 35 U.S.C. 154(b) by 0 days.

(21) Appl. No.: 11/875,248

(22) Filed: Oct. 19, 2007

(65) Prior Publication Data

US 2008/0124995 A1 May 29, 2008

(30) Foreign Application Priority Data

Nov. 27, 2006 (JP) ............................ 2006-319302

(51) Int. Cl.
*D04H 1/00* (2006.01)
*D04H 13/00* (2006.01)
*D04H 3/00* (2006.01)
*D04H 5/00* (2006.01)

(52) U.S. Cl. ...................... 442/329; 442/400; 442/401; 442/415

(58) Field of Classification Search ................. 442/329, 442/415, 400, 401
See application file for complete search history.

(56) References Cited

U.S. PATENT DOCUMENTS

| 2004/0067710 A1 | 4/2004 | Tsujiyama et al. |
| 2004/0132374 A1 * | 7/2004 | Kobayashi ................. 442/328 |
| 2006/0121812 A1 * | 6/2006 | Suzuki et al. ............... 442/411 |

FOREIGN PATENT DOCUMENTS

| JP | 6093551 | 4/1994 |
| JP | 2004-131918 A | 4/2004 |

* cited by examiner

*Primary Examiner*—Norca L Torres-Velazquez
(74) *Attorney, Agent, or Firm*—Darby & Darby P.C.

(57) ABSTRACT

Nonwoven fabric includes thermoplastic elastomer fiber and thermoplastic polyolefin fiber. A variation of b-value appearing in laboratory color specifying system before and after irradiation of the thermoplastic elastomer fiber with 5000 KJ/m$^2$ of UV radiation is 20 or higher, a variation of b-value appearing in the laboratory color specifying system before and after irradiation of the nonwoven fabric with 5000 KJ/m$^2$ of UV radiation is 10 or less.

6 Claims, No Drawings

NONWOVEN FABRIC

BACKGROUND OF THE INVENTION

The present invention relates to nonwoven fabrics and particularly to nonwoven fabric containing thermoplastic elastomer fiber used for sanitary article.

Nonwoven fabric containing polyurethane-based thermoplastic elastomer (referred to hereinafter as TPU) is conventionally used for clothing or sanitary articles on account of high elasticity and minor permanent elongation. For example, Japanese Unexamined Patent Application Publication No. 2004-131918 discloses elastically stretchable nonwoven fabric formed from elastically stretchable first fiber made of thermoplastic polyurethane and inelastically stretchable second fiber made of polyolefin-based polymer wherein this nonwoven fabric is used for sanitary articles such as disposable diapers, disposable pants and disposable gowns for hospital-use.

As is generally known, synthetic resin is discolored due to UV degradation and, particularly, TPU turns yellow due to conjugate double bond when it is exposed to UV radiation. Specifically, if the sanitary articles are exposed to the sunlight, for example, if the sanitary articles are left exposed to the sunlight on the store shelves, these articles sometimes turn yellow. Particularly in the case of the sanitary articles, such yellow discoloration may seriously reduce commercial value of the articles and/or may cause the articles to be misunderstood as if they are poor in quality.

SUMMARY OF THE INVENTION

In view of such problem unsolved behind by the prior art, it is an object of the present invention to provide nonwoven fabric containing thermoplastic elastomer improved so as to be free from a possibility of yellow discoloration.

The inventors have found that, in the nonwoven fabric containing thermoplastic elastomer fiber and polyolefin fiber, UV radiation directed to thermoplastic elastomer fiber can be effectively masked and scattered by polyolefin fiber so as to achieve effective inhibition of yellow discoloration which otherwise might occur therein, so far as a specific relationship is established between percentages by mass and fiber diameters of these two kinds of fiber. Based on such findings, the present invention has been developed. Thus, the object set forth above is achieved, according to the present invention, by an improvement in the nonwoven fabric comprising thermoplastic elastomer fiber and thermoplastic polyolefin fiber.

The improvement according to the present invention comprises the following:

a variation of b-value appearing in laboratory color specifying system before and after irradiation of the thermoplastic elastomer fiber with 5000 KJ/m$^2$ of UV radiation is 20 or higher;

a variation of b-value appearing in laboratory color specifying system before and after irradiation of the nonwoven fabric with 5000 KJ/m$^2$ of UV radiation is 10 or less; and a relationship expressed by the following equation (1) is established:

$$\frac{w_1 r_2 \rho_2}{r_1^2 (w_1 r_2 \rho_2 + w_2 r_1 \rho_1)} \geq 9.7 \times 10^{-4} \quad \text{(Equation 1)}$$

where $w_1$: a percentage (%) by mass of polyolefin fiber in the nonwoven fabric;

$r_1$: a radius (μm) of polyolefin fiber;

$\rho_1$: a density (g/cm$^3$) of polyolefin fiber;

$w_2$: a percentage (%) by mass of thermoplastic elastomer in the nonwoven fabric;

$r_2$: a radius (μm) of thermoplastic elastomer fiber; and $\rho_2$: a density (g/cm$^3$) of thermoplastic elastomer fiber.

According to one preferred embodiment of the invention, the nonwoven fabric is fiber-combined nonwoven fabric made from thermoplastic elastomer fiber and thermoplastic polyolefin fiber wherein a content of thermoplastic elastomer fiber in the nonwoven fabric is in a range of 20 to 80% by mass.

According to another preferred embodiment of the invention, the nonwoven fabric is a laminate of a layer containing thermoplastic elastomer fiber and a layer containing only thermoplastic polyolefin fiber wherein a content of thermoplastic elastomer fiber in the laminate is 20% by mass or more but less than 95% by mass. It should be understood that the layer containing thermoplastic elastomer fiber defined herein may be the layer containing thermoplastic elastomer fiber alone or the layer containing both thermoplastic elastomer fiber and thermoplastic polyolefin fiber in the form of combined fiber.

So far as the relationship represented by the equation 1 is established between thermoplastic elastomer fiber and thermoplastic polyolefin fiber having a fiber diameter smaller than that of thermoplastic elastomer fiber both cooperating with each other to form the nonwoven fabric according to the invention, polyolefin fiber functions to mask and/or scatter the UV radiation directed to thermoplastic elastomer fiber. In this way, the present invention can provide the nonwoven fabric of which undesirable yellow discoloration is inhibited.

DETAILED DESCRIPTION OF THE PREFERRED EMBODIMENTS

Nonwoven fabric according to the present invention comprises thermoplastic elastomer fiber and thermoplastic polyolefin fiber. Such nonwoven fabric is suitable particularly for sanitary articles. The present invention will be described later with respect to the case in which thermoplastic elastomer is TPU.

TPU fiber may be made of any one selected from various types of TPU which are well known in the technical field of sanitary articles, for example, TPU consisting of block having urethane bond as a hard segment and polyol having hydroxyl at each end as a soft segment.

Polyolefin fiber may be made of any one selected from various types of polyolefin which are well known in the technical field of sanitary articles, for example, polyethylene and polypropylene. The term "polyolefin fiber" used herein should be understood to include single fiber such as polyethylene or polypropylene fiber and core-sheath type of composite fiber well known in the technical field such as the composite fiber comprising polyester or polyamide as the core and polyolefin as the sheath.

In general, nonwoven fabric may be made by any one of well known processes including a so-called air-lay process and a carding process. However, particularly in the case of the nonwoven fabric used for sanitary articles, it is preferred to employ a melt-blow or spun bond process adapted to provide for long fiber nonwoven fabric which is advantageous from the viewpoint of flexibility and strength.

To make the fiber-combined nonwoven fabric from TPU fiber and polyolefin fiber, respective resin may be independently molten, then ejected through respective spinnerets so as to be subjected to a cooling effect, for example, of air blast in the course of flowing down and thereby to obtain respective fibers which are, in turn, accumulated on a movable collector belt and, if desired, subjected to a suitable heat sealing treatment. In consideration of the fact that TPU fiber is stickier than polyolefin fiber and apt to stick to the other fiber in the course of making the nonwoven fabric, it is desired to control a melt temperature and a cooling condition so that no excessive number of inter-fiber heat fused spots might be formed.

When the fiber-combined nonwoven fabric made from TPU fiber and polyolefin fiber is used for the sanitary article, a content of TPU fiber in the nonwoven fabric as entirety is preferably in a range of 20 to 80% by mass. If the content of TPU fiber exceeds 80% by mass, it will be difficult to inhibit yellow discoloration and the surface of the nonwoven fabric will become sticky. If the content of TPU fiber is less than 20% by mass, on the other hand, the permanent elongation inevitably occurring as the sanitary article is stretched to put it on the wearer's body will be beyond the allowable maximum and consequentially a fit of the nonwoven fabric to the wearer's body will be deteriorated.

In the case of the nonwoven fabric implemented in the form of a laminate consisting of a layer containing TPU fiber and a layer containing polyolefin fiber alone, the content of thermoplastic elastomer fiber in the laminate as entirety is preferably 20% by mass or higher but less than 95% by mass. If the content of TPU fiber exceeds 95% by mass, it will be difficult to inhibit yellow discoloration. If the content of TPU fiber is less than 20% by mass, on the other hand, the problem of fit will occur as in the case described just above. The layer containing polyolefin fiber alone may be laminated on the layer containing TPU fiber to prevent the surface of the nonwoven fabric from becoming sticky. Preferably, in this case, the layer containing polyolefin fiber alone is laminated also on one or both surfaces of the layer containing thermoplastic elastomer fiber.

A fiber diameter of polyolefin fiber is preferably as minimized as possible in order to improve a texture of the nonwoven fabric. In order to ensure that UV radiation can be effectively masked and scattered by polyolefin fiber, a fiber diameter of polyolefin fiber is preferably adjusted to be less that the fiber diameter of TPU fiber. If hot melt adhesive is used to bond the nonwoven fabric to the other components in the course of making the sanitary article, the fiber diameter of polyolefin fiber may be adjusted preferably to 25 μm or less to ensure that the hot melt adhesive sinks through the nonwoven fabric toward the surface opposed to the surface coated with the hot melt adhesive and consequentially the surface of the nonwoven fabric coated with the hot melt adhesive is reliably prevented from become sticky.

A fiber diameter of TPU fiber also is preferably as minimized as possible in order to improve a texture of the nonwoven fabric. While it is generally difficult to obtain TPU fiber having a diameter of 25 μm or less since a melting stringiness of TPU is lower than that of the polyolefin, it will be obvious that TPU fiber having a fiber diameter of 25 μm or less is also within the scope of the invention, assumed that such TPU fiber can be practically obtained.

The nonwoven fabric obtained by the well known process such as the melt blow process is preferably further subjected to a step of drafting within a range in which thermoplastic elastomer fiber is elastically deformable and beyond a range in which thermoplastic polyolefin fiber is elastically deformable but at a percentage of elongation causing no breakage of thermoplastic polyolefin fiber. Such draft allows the fiber diameter of polyolefin fiber obtained by melt spinning to be further reduced. In addition, such draft is effective to improve a crystallization degree of polyolefin and thereby to increase internal haze. In this way, UV radiation can be further effectively masked and scattered to inhibit yellow discoloration.

After the nonwoven fabric comprising TPU fiber and polyolefin fiber has been subjected to the draft processing, a length of polyolefin fiber become longer but TPU fiber has its fiber length unchanged due to its elastic restoration. As a result, the nonwoven fabric as entirety becomes more bulky than before subjected to the step of draft. Specifically, TPU fiber is enclosed by such bulky polyolefin fiber. In this way, UV radiation directed to TPU fiber is effectively masked and scattered by this bulky polyolefin fiber to inhibit yellow discoloration.

When the nonwoven fabric comprising TPU fiber and polyolefin fiber is subjected to the step of draft, for example, the process for making then on woven fabric disclosed in Japanese Unexamined Patent Application Publication No. 2004-131918 may be used.

Details of the nonwoven fabric according to the present invention will be more fully understood from the description of several examples.

Examples 1 through 5 are fiber-combined nonwoven fabric TPU fiber and polyolefin fiber wherein the polyolefin fiber has the percentage by mass and the fiber diameter appropriately varied (TABLE 1). Example 6 through 11 are laminates each consisting of the layer containing TPU fiber alone and the layer containing polyolefin fiber alone wherein the polyolefin fiber has the percentage by mass and the fiber diameter appropriately varied (TABLE 2).

CONTROL 1 is the nonwoven fabric comprising TPU fiber alone and CONTROL 2 is the nonwoven fabric being unable to meet a relationship expressed by an equation 1 as will be described (TABLE 1). It should be understood that a value calculated from the equation 1 is referred to as a masking index.

$$\frac{w_1 r_2 \rho_2}{r_1^2 (w_1 r_2 \rho_2 + w_2 r_1 \rho_1)} \geq 9.7 \times 10^{-4} \qquad \text{(Equation 1)}$$

<Method for Making Test Pieces>

TPU having melting viscosity=2100 Pa·s(200° C.), Shore hardness (A)=60, density=1.2 g/cm³, and soft segment defined by polyester polyol was used as material for the respective EXAMPLES and the respective CONTROLS. Blend of polypropylene homopolymer and high density polyethylene at a weight ratio of 96:4 was used as material for the polypropylene wherein the polypropylene homopolymer had MFR=60(230° C., load=2.16 kg) and density=0.91 g/cm³ while the high density polyethylene had MFR=5.0(190° C., load=2.16 kg) and density=0.97 g/cm³.

The fiber-combined nonwoven fabric of TPU fiber and polyolefin fiber was made by the above-mentioned melt spinning process. Particularly, EXAMPLES 1 through 5 were further subjected to a step of draft using gears so as to be drawn at a draw ratio of 2.6 and thereby to provide test pieces.

Test pieces as CONTROLS 1 and 2 were prepared without any additional step of draft.

The nonwoven fabric in the form of laminate of TPU fiber and polyolefin fiber was obtained by making the nonwoven fabric layers containing respectively specified fibers, coating the nonwoven fabric layer containing polyolefin fiber alone with hot melt adhesive as much as a basis weight of 5 g/m² in spiral pattern, laminating the nonwoven fabric layer containing TPU fiber alone upon the nonwoven fabric layer of polyolefin fiber, and integrally bonding these two layers to each other (EXAMPLES 6 through 11).

<Method for UV Irradiation>

For UV irradiation, the UV irradiating apparatus commercially available from SUGA TEST INSTRUMENTS CO., LTD. (Japan) under the trade name "FAL-25X-HC Model." Using a xenon lamp as light source, UV irradiation was carried out at a temperature of 50° C. so that UV intensity in a range of 85 to 150 KJ/m$^2$/Hr can be ensured in a range of 300 nm to 400 nm. Test pieces each having a width of 50 mm and a length of 40 mm were UV irradiated until a level of 5000 KJ/m$^2$ was attained.

<Method for evaluation of yellow discoloration>

Degree of yellowness was evaluated for the respective test pieces before and after UV irradiation by determination of variations (referred to hereinafter as Δ d) appearing in b-value which represents a yellowing component in laboratory color specifying system. In evaluation of yellow discoloration, it was concluded that yellow discoloration is effectively inhibited at the measurement result indicating Δ b≦10 on the basis of the observation that the yellow discoloration was visually confirmed and degradation of commercial value was obvious. In an outdoor exposure test which was separately conducted, it was confirmed that exposure of the test pieces to direct sunlight for three days results in Δb>10.

Δ b was measured using the calorimeter commercially available from MINOLTA CO. (Japan) under the trade name "CR300." Measurement was carried out after the calorimeter had been whiteness-calibrated. The b-value was measured through FILTER PAPER (100×100 mm) attached to each of the test pieces on its backside. Δb was calculated as a different b-values measured on each of the test pieces before and after UV irradiation.

TABLES 1 and 2 list a series of Δb which were calculated on the respective test pieces.

TABLE 1

| Basis weight (Mass) (g/m$^2$) | TPU fiber Mass % | TPU fiber Radius (μ) | Polyolefin fiber Mass % | Polyolefin fiber Diameter (μ) | Masking index (×10$^4$) | Δb (—) |
|---|---|---|---|---|---|---|
| Example 1 | 40 | 50 | 25 | 50 | 13 | 42 | 4.0 |
| 2 | 41 | 50 | 25 | 50 | 18 | 20 | 7.0 |
| 3 | 45 | 40 | 25 | 60 | 25 | 1.0 | 10 |
| 4 | 45 | 40 | 25 | 60 | 18 | 23 | 4.0 |
| 5 | 43 | 40 | 25 | 60 | 13 | 47 | 1.0 |
| Control 1 | 45 | 100 | 25 | 0 | — | 0 | 20 |
| 2 | 33 | 95 | 25 | 5 | 13 | 0.7 | 15 |

Density of urethane=1.2 g/cm$^3$, Density of olefin=0.91 g/cm$^3$

TABLE 2

| | TPU fiber layer | | | Polyolefin fiber layer | | | | |
|---|---|---|---|---|---|---|---|---|
| | Basis weight (Mass) (g/m$^2$) | Mass % | Diameter (μ) | Basis weight (Mass) (g/m$^2$) | Mass % | Diameter (μ) | Masking index (×10$^4$) | Δb (—) |
| Example 6 | 35 | 80 | 25 | 9 | 20 | 18 | 9.7 | 6.7 |
| 7 | 35 | 78 | 25 | 10 | 21 | 13 | 24 | 6.2 |
| 8 | 35 | 66 | 25 | 18 | 34 | 18 | 15 | 1.7 |
| 9 | 35 | 49 | 25 | 36 | 51 | 18 | 20 | 0.9 |
| 10 | 35 | 65 | 25 | 19 | 35 | 13 | 34 | 1.7 |
| 11 | 35 | 48 | 25 | 38 | 52 | 13 | 43 | 0.7 |

Density of urethane=1.2 g/cm$^3$, Density of olefin=0.91 g/cm$^3$

As will be apparent from TABLE 1, the masking index<9.7×10$^{-4}$ results in Δb>10 and makes it impossible to achieve inhibitory effect against yellow discoloration as CONTROLS 1 and 2 are the cases. From the other viewpoint, the content of TPU fiber in the nonwoven fabric being 95% by mass or higher makes it impossible to assure the desired inhibitory effect against yellow discoloration. The masking index of 9.7×10$^{-4}$ or higher, on the contrary, results in Δb≦10 no matter whether the nonwoven fabric is the fiber-combined nonwoven fabric made from TPU fiber and polyolefin fiber (EXAMPLES 1 through 5) or the laminate of TPU fiber and polyolefin fiber (EXAMPLES 6 through 11). Consequently, the nonwoven fabric reliably protected against yellow discoloration is provided. In these EXAMPLES, the content of TPU fiber is preferably less than 95% by mass and more preferably less than 80% by mass.

As will be appreciated from comparison between EXAMPLE 1 and EXAMPLE 2 as well as comparison among EXAMPLES 3 through 5, the smaller the fiber diameter of polyolefin is, the smaller the value of Δb is and thus the inhibitory effect against yellow discoloration is correspondingly improved, so far as the content of polyolefin fiber is kept in the same % by mass. This is believed to be for the reason that, with the content of polyolefin fiber kept in the same % by mass, a projected sectional area of polyolefin fiber given by fiber diameter×fiber length becomes larger as fiber diameter thereof is reduced. Assumed that yellow discoloration of TPU fiber can be inhibited merely by enlarging the projected sectional area of polyolefin fiber, the masking effect should be a function of (fiber diameter of polyolefin fiber)$^{-1}$.

However, the masking effect depends on (fiber diameter of polyolefin fiber)$^{-3}$ as indicated by Equation 1. In addition to the projected sectional area of polyolefin fiber, it is believed that scattering of UV ray by the surface or the internal haze, for example, Rayleigh scattering also contributes to effective inhibition against yellow discoloration of thermoplastic elastomer fiber.

As will be understood from the foregoing description, in the nonwoven fabric according to the present invention, polyolefin fiber effectively masks and/or scatters UV ray directed to thermoplastic elastomer fiber and thereby effectively inhibits yellow discoloration which otherwise would occur in thermoplastic elastomer fiber, so far as a specific relationship is established between the content (% by mass) and the fiber diameter of thermoplastic elastomer fiber, on one hand, and these content and fiber diameter of polyolefin fiber, on the other hand.

In fiber-combined nonwoven fabric made from thermoplastic elastomer fiber and polyolefin fiber, it was found that such fiber-combined nonwoven fabric may be subjected to additional step of draft to improve crystallization degree of polyolefin.

As test piece, the fiber-combined nonwoven fabric made from 50 mass % of TPU fiber and 50 mass % of polypropylene fiber was used. This nonwoven fabric was subjected to a step of draft using gears wherein a draw ratio was adjusted by varying a working gear depth. Crystallization degree was measured using DSC-60 manufactured by Shimadzu Corporation. Specifically, heat quantity of melting was measured at a programming rate of 10° C./min and the crystallization degree of polypropylene was determined on the assumption that a crystallization degree of polypropylene attains to 100% at its melting heat quantity of 165 J/g. The measurement result is shown by TABLE 3.

subjected to the step of draft to improve the crystallization degree of thermoplastic elastomer fiber sufficiently to scatter and mask the incident radiation so that the UV radiation quantity attainable to thermoplastic elastomer fiber is sufficiently reduced to ensure the desired inhibitory effect against yellow discoloration of thermoplastic elastomer.

The fiber-combined nonwoven fabric was subjected to the step of draft using gears at a draw ratio of 2.6 to obtain test pieces for tensile test. As seen in TABLE 4 indicating a result of the tensile test which has been conducted on EXAMPLES 15 and 16 having the same basis weight, polyolefin fiber in EXAMPLE 16 having a relatively small fiber diameter exhibited higher values with respect to breaking force as well as to breaking elongation. This measurement result seems to be supported by the fact that the number of filaments of polyolefin fiber was increased by reducing the fiber diameter without varying the basis weight and the number of points at which polyolefin fiber and TPU fiber are fusion bonded to each other

TABLE 3

|  | Working depth of gear mm | Draw ratio (—) | Basis weight (Mass) g/m² | Post-Draw thickness mm | TPU Fiber diameter μm | Polyolefin Fiber diameter μm | Crystallinity % |
|---|---|---|---|---|---|---|---|
| Control 3 | 0 | 1.0 | 36 | 0.21 | 24 | 23 | 44 |
| Example 12 | 4.0 | 1.9 | 38 | 0.77 | 25 | 20 | 46 |
| 13 | 6.0 | 2.6 | 37 | 0.98 | 27 | 18 | 47 |
| 14 | 6.5 | 2.8 | 36 | 1.0 | 26 | 17 | 48 |

As will be understood from TABLE 3, with the substantially same basis weight, the fiber diameter of polyolefin (polypropylene) is reduced in response to the draw ratio being increased while the fiber diameter of TPU fiber remains substantially the same before and after the step of draft but thickness, i.e., bulkiness thereof increases as the step of draft progresses. The crystallization degree of polyolefin fiber also increases as the step of draft progresses. The higher the crystallization degree is, the higher the internal haze is. As a result, the incident radiation is effectively scattered and masked.

was increased in the course of making the nonwoven fabric since TPU fiber in its molten state generally tends to adhere to the other fiber.

TABLE 4

|  | Basis weight (Mass) g/m² | TPU fiber | | Polyolefin fiber | | Breaking force N/50 mm | Breaking elongation % |
|---|---|---|---|---|---|---|---|
|  |  | Mass % | Diameter (μ) | Mass % | Diameter (μ) |  |  |
| Example 15 | 35 | 40 | 25 | 60 | 18 | 43 | 170 |
| 16 | 33 | 40 | 25 | 60 | 13 | 51 | 190 |

In this way, the nonwoven fabric comprising thermoplastic elastomer fiber and thermoplastic polyolefin fiber may be As will be obviously understood from the foregoing description, the present invention provides the nonwoven fabric wherein the thermoplastic elastomer fiber can be effectively protected against yellow discoloration thereof by reducing the fiber diameter of polyolefin fiber. In addition to such inhibitory effect against yellow discoloration, the nonwoven fabric according to the present invention has its strength sufficiently improved to be suitably used as nonwoven fabric for sanitary articles such as disposable diapers, disposable pants and disposable hospital-use gowns.

What is claimed is:
1. Nonwoven fabric comprising thermoplastic elastomer fiber and thermoplastic polyolefin fiber wherein the thermo- plastic polyolefin fiber in the nonwoven fabric has a fiber diameter of 25 μm or less and smaller than a fiber diameter of the thermoplastic elastomer fiber, the thermoplastic polyolefin fiber having a crystallinity that is greater than or equal to 46%;

the nonwoven fabric being produced by drafting using gears within a range in which thermoplastic elastomer fiber is elastically deformable and beyond a range in which thermoplastic polyolefin fiber is elastically deformable but at a percentage of elongation causing no breakage of thermoplastic polyolefin fiber;

a variation of b-value appearing in laboratory color specifying system before and after irradiation of said thermoplastic elastomer fiber with 5000KJ/m2 of UV radiation being 20 or higher;

a variation of b-value appearing in laboratory color specifying system before and after irradiation of said nonwoven fabric with 5000KJ/m2 of UV radiation being 10 or less; and a relationship expressed by a following equation (1) being established:

$$\frac{w_1 r_2 \rho_2}{r_1^2 (w_1 r_2 \rho_2 + w_2 r_1 \rho_1)} \geqq 9.7 \times 10^{-4} \qquad \text{(Equation 1)}$$

where
- w1: a percentage (%) by mass of polyolefin fiber in the nonwoven fabric;
- r1: a radius (μm) of polyolefin fiber;
- p1: a density (g/cm3) of polyolefin fiber;
- w2: percentage (%) by mass of thermoplastic elastomer fiber in the nonwoven fabric;
- r2: a radius (μm) of thermoplastic elastomer fiber; and
- p2: a density (g/cm3) of thermoplastic elastomer fiber.

2. The nonwoven fabric according to claim 1 wherein said nonwoven fabric is fiber-combined nonwoven fabric obtained from said thermoplastic elastomer fiber and said thermoplastic polyolefin fiber wherein a content of said thermoplastic elastomer fiber in said nonwoven fabric is in a range of 20 to 80% by mass.

3. The nonwoven fabric according to claim 1, wherein said nonwoven fabric is a laminate of a layer containing said thermoplastic elastomer fiber and a layer containing said thermoplastic polyolefin fiber alone and a content of said thermoplastic elastomer fiber in said laminate is 20% by mass or more but less than 95% by mass.

4. The nonwoven fabric according to claim 3, wherein said layer containing only said thermoplastic polyolefin fiber is laminated on one or both sides of said layer containing said thermoplastic elastomer fiber.

5. The nonwoven fabric according to claim 3, wherein said layer containing said thermoplastic elastomer fiber is made from fiber obtained by melt spinning process.

6. The nonwoven fabric according to claim 1, wherein said thermoplastic elastomer fiber is polyurethane fiber.

* * * * *